United States Patent
Smith et al.

(10) Patent No.: US 8,252,085 B1
(45) Date of Patent: Aug. 28, 2012

(54) PROCESS FOR THE RECOVERY OF METALS FROM USED NICKEL/METAL HYDRIDE BATTERIES

(75) Inventors: W. Novis Smith, Philadelphia, PA (US); Scott Swoffer, Folcroft, PA (US)

(73) Assignee: Toxco, Inc., Anaheim, CA (US)

( * ) Notice: Subject to any disclaimer, the term of this patent is extended or adjusted under 35 U.S.C. 154(b) by 0 days.

(21) Appl. No.: 13/066,103

(22) Filed: Apr. 6, 2011

Related U.S. Application Data

(63) Continuation-in-part of application No. 12/806,877, filed on Aug. 23, 2010.

(51) Int. Cl.
*C22B 23/00* (2006.01)
*C01F 7/00* (2006.01)

(52) U.S. Cl. .......................................... 75/711; 423/177
(58) Field of Classification Search .................... 75/711; 423/122
See application file for complete search history.

(56) References Cited

U.S. PATENT DOCUMENTS 6,110,433 A * 8/2000 Kleinsorgen et al. ........ 423/21.1

* cited by examiner

*Primary Examiner* — Jie Yang
(74) *Attorney, Agent, or Firm* — John Lezdey

(57) ABSTRACT

The invention relates to the purification of recovered $AB_5$ alloy which is obtained from spent nickel/metal hydride storage batteries by the selective removal of any $Ni(OH)_2$ and the recovery of lanthanum without dissolving any $AB_5$ alloy.

8 Claims, No Drawings

PROCESS FOR THE RECOVERY OF METALS FROM USED NICKEL/METAL HYDRIDE BATTERIES

RELATED APPLICATION

This application is a continuation-in-part application of Ser. No. 12/806,877 filed Aug. 23, 2010.

FIELD OF THE INVENTION

The present invention relates to the purification of recovered $AB_5$ alloy which is obtained from spent nickel/metal hydride (NIMH) storage batteries. More particularly, there is provided a process for the selective removal of nickel hydroxide $(Ni(OH)_2$ which is present in $AB_5$ recovery processes and the recovery of lanthanum.

DESCRIPTION OF THE RELATED ART

Nickel/metal hydride storage batteries are electrochemical energy storage systems which, compared with other storage batteries such as, for example, the lead storage battery or the nickel/cadmium storage battery, have a higher storage capacity. These storage systems are therefore increasingly widespread not only for the main independent supply of energy to appliances in entertainment electronics, toys and the like, for example in the form of button cells, but also significantly used in hybrid electric vehicles for direct electric drives contained in larger size battery casings.

The nickel/metal hydride storage batteries accommodate one or more positive electrodes and one or more negative electrodes.

A positive electrode is conventionally composed of a support and the active cathode mass. The active mass of the positive electrode is a mixture of nickel hydroxide and cobalt oxide and nickel or cobalt powder metal. In addition to binders and conducting agents, the mixture may contain further metal and rare earth compounds including zinc, as hydroxides in lesser amounts.

A negative electrode is likewise composed of support and active anode mass. In this case, the latter is a hydrogen-storage alloy. Hydrogen-storage alloys are intermetallic compounds which can be assigned to a $AB_5$ type on the basis of the simple starting alloy $LaNi_5$ or to an $AB_2$ type in accordance with the simple alloy $TiNi_2$.

Hydrogen-storage alloys of the $AB_5$ type for nickel/metal hydride storage batteries are conventionally composed of 45-55% Ni, 30-35% rare earths (REM), 5-15% Co, 2-5% Mn and 1-4% Al.

The valuable content substances of said NIMH batteries make their recovery from waste batteries a particularly urgent requirement.

Many processes are already known for processing used storage batteries, directed in particular at the acidic lead storage batteries. Of these, the processing methods for lead/acid storage batteries are of little interest here because they are remote from the subject of the invention.

U.S. Pat. No. 5,858,061 to Kleinsorgen et al, which is herein incorporated by reference uses a liquid/liquid extraction and pH of the digestion solution of NIMH batteries in such a way that metal nickel and cobalt are dissolved in an aqueous phase.

The invention is more preferably used in a cell containing a negative electrode having hydrogen storage alloy materials of the so-called $AB_5$-type, a common example of which is described in the basic formula $M_sNiAl_xMn_4CO_3$ and $M_sNi_5(Al_xMn_4CO_3)_x$ wherein $M_s$ represents a lanthanum-rich misch metal (REM), which includes various rare earth metals and wherein $2.5<r<5.0$, $0<s<2.5$, $0<t<0.5$, and $0<u<0.5$. Hydrogen absorbing alloys of this class (i.e., $AB_5$) are disclosed, for instance, in U.S. Pat. No. 4,216,274 (Bruning et al) and U.S. Pat. No. 4,375,257 (Bruning, et al).

Typical alloys for the negative counterpart electrode include the so-called $AB_2$-type as disclosed, for instance, in U.S. Pat. No. 4,431,561 (Ovshinsky, et al) and U.S. Pat. No. 4,716,088 (Reichman, et al). The typical $AB_2$-type materials, as currently envisioned, are based on $TiNi_2$ and typically have the basic atomic structure Ni—Ti—V—Cr—Zr—X—Y wherein X and Y can be other elements of various selection. The invention is more preferably used in a cell containing a negative electrode having hydrogen storage intermetallic alloy materials of the so-called $AB_5$-type, a common example of which are described in the basic formula $MmNi_rCO_sMn_t$ $Al_u$, wherein Mm represents a lanthanum-rich misch metal, which includes various rare earth metals, and wherein $2.5<r<5.0$, $0<s<2.5$, $0<t<0.5$, and $0<u<0.5$ and $M_sNiAl_xMn_4CO_3$. Hydrogen absorbing alloys of this class (i.e. $AB_5$) are disclosed, for instance, in U.S. Pat. No. 4,216,274 (Bruning, et al) and U.S. Pat. No. 4,375,257 (Bruning, et al).

Also a combination of $AB_5$ and $AB_2$ have been utilized in forming the negative electrode.

Negative electrode alloys used in NiMH batteries typically comprise La, Pr and Nd as rare earth elements and Zn, Mg and Ni. Cobalt, manganese and aluminum are common additives.

The components of the NIMH battery include nickel metal grid, $Ni(OH)_2$, nickel coated iron, potassium hydroxide electrolyte, and most importantly a nickel metal alloy powder of up to 25-30% by weight. This alloy powder has been developed to absorb considerable hydrogen and is the source of the descriptor "nickel metal hydride" battery. Under charging conditions this nickel alloy absorbs significant amounts of hydrogen as the metal hydride is formed electrochemically. Under battery discharge conditions this absorbed hydrogen reacts electrochemically back to hydroxide and water providing the electrical current of the battery. The currently most well known nickel alloy used is termed $AB_5$ which is an alloy consisting of one part misch metal (mostly lanthanum or REM) to five parts nickel on a mole basis—theoretically 32.1% (REM) on a weight basis. Therefore the naturally occurring rare earth oxide mixture is used to form the misch metal which avoids the expense of separating the rare earth oxides into the individual elements before reducing them to the mixed metal and not to the pure metal such as pure lanthanum metal. This metal mixture is used which is called misch metal. Therefore the $AB_5$ alloy is an alloy of a mixture of lanthanum group metals and nickel with some cobalt and other metals added in small amounts for optimized hydrogen formation and storage. This $AB_5$ component is the most expensive raw material cost for this battery. In addition the applications for the different rare earth oxides (lanthanum group oxides/metals) is growing for use in permanent magnets for high energy density motors, dopants and a host of other applications while at the same time the production of these materials is limited and tightly controlled from China. In other words these materials are in a long term critical situation.

SUMMARY OF THE INVENTION

According to the present invention there is provided a method for the purification of a mixture of hydrogen storage intermetallic alloy $AB_5$ obtained from the electrodes of spent nickel metal hydride batteries together with any lanthanum present and the separate recovery of $Ni(OH)_2$ which is present. The process comprises the steps of (a) selectively dissolving $Ni(OH)_2$ from the recovered $AB_5$ containing mixture with a carboxylic acid having 1-8 carbon atoms and maintaining a pH of about 2.7 to 3.4 in an aqueous media without dissolving the $AB_5$ intermetallic alloy and lanthanum; (b) filtering the product of step (a); (c) washing the solids from step (b); and then (d) drying the solids under an inert atmosphere.

Advantageously, the solids of step (d) may be treated with hydrogen or a sodium metal to remove any metal oxide.

It is therefore a general object of the invention to purify a mixture containing hydrogen storage intermetallic $AB_5$ which obtained from the electrodes of spent nickel metal hydride batteries.

It is a further object of the inventor to separate and obtain $AB_5$ and lanthanum from electrodes of spent nickel metal hydride alloys.

It is yet another object of the invention to provide purified $AB_5$ for use in batteries for electronic devices.

DESCRIPTION OF THE PREFERRED EMBODIMENTS

According to the invention there is provided a method for the purification and isolation of hydrogen storage intermetallic alloy $AB_5$ and any lanthanum present from material obtained from spent nickel metal hydride battery electrodes which comprises the steps of:

A) Selectively dissolving the material from said electrodes with a carboxylic acid having 1 to 8 carbon atoms and maintaining a pH of about 2.7 to 3.4 without dissolving said intermetallic alloy $AB_5$ and any lanthanum present;

B) filtering the product from step A),

C) washing the solids from step B), and then

D) drying the solids under an inert atmosphere.

The drying of the solids in step D) is preferably conducted under a vacuum at an elevated temperature.

The product of Step D) can be screened through a −325 mesh screen.

The product of Step D) can be further upgraded if required by reduction with sodium metal under an inert atmosphere or by a mild hydrogen reduction at about 100° to 300° C.

The carboxylic acid used in Step A) includes acetic acid, propionic acid, lactic acid, formic acid, citric acid, glycolic acid and glyoxylic acid.

It has been discovered that the mix of nickel hydroxide and the nickel metal hydride alloy powder such as $AB_5$ can be separated by froth flotation as described in co-pending application Ser. No. 12/806,877 to obtain a nickel hydroxide float fraction consisting of essentially cathode materials and a sinks fraction of >55% nickel metal hydride with some of the $Ni(OH)_2$ still adhering to it due to the binder used in the original coating on the electrodes.

Also the purity of the recovered $AB_5$ alloy can be upgraded to almost pure $AB_5$ by carefully dissolving the $Ni(OH)_2$ cathode material (and the other cathode additives) with a carboxylic acid while maintaining the pH at above about 2.7 to 3.4 with stirring. The $Ni(OH)_2$ is selectively dissolved away from the nickel metal alloy. If harsher conditions are used the nickel metal alloy begins to dissolve and the overall recovery is lessened. Oxalic acid and strong mineral acids such as hydrochloric, nitric and sulfuric acid are not selective and leave inorganic anion contaminants which do not burn off. The trace impurities left by the organic acids are readily removed by heating, washing and recovering nickel metal hydride alloy ($AB_5$) under inert atmosphere to 350° C.

This selective procedure will dissolve all of the $Ni(OH)_2$ selectively to yield essentially pure nickel metal hydride alloy. The product may contain some oxygen as a metal oxide up to 4%. This can be removed with a hydrogen treatment at an elevated temperature of 100°-300° C. and pressure or treatment with 10-30% preferably 15% sodium metal and heating to 100°-300° C. for an hour and then washing for example in methanol and then water and drying.

This selective dissolution/purification procedure will work on any mixture of the nickel metal hydride and the $Ni(OH)_2$ cathode material. It can be applied to those mixtures recovered from the processing and recycling of NIMH batteries. It can also be applied to electrode powders recovered from nickel/hydrogen batteries.

The following examples serve to explain the invention in more detail, where the examples are intended to facilitate understanding of the principle according to the invention and are not to be understood as meaning a limitation thereof.

EXAMPLE 1

100 g of a 75% by weight powder mixture (−50 mesh) of $Ni(OH)_2$ and 25% by weight of a hydrogen absorbing nickel alloy ($AB_5$) containing 18.6% La was stirred in 900 ml water at room temperature. The pH was adjusted down to 2.7 with acetic acid. Acetic acid was added slowly for another 2 hours while stirring to maintain the pH at 2.7 with a total of 250 g acetic acid added. The slurry was stirred for two hours and the pH rose to 3.5. The slurry was filtered and washed with water and dried under vacuum at 100° C. The resulting up graded $AB_5$ powder weighed 24 g and contained 18.6% La indicating essentially complete selective removal of the $Ni(OH)_2$. The intact recovered $AB_5$ containing the rare earth metals in the original ratio can be used directly in preparation of new $AB_5$ alloy. It can also be upgraded further with a limited reduction with molten sodium metal under inert atmosphere or with mild hydrogen reduction at 100-300° C.

EXAMPLE 2

24 g of a 42% by weight powder mixture (−140 mesh) of $Ni(OH)_2$ and 58% by weight of a hydrogen absorbing nickel alloy ($AB_5$) containing 18.5% La was stirred in 230 ml water at room temperature. (The mixture was the sink portion obtained by froth flotation of the cathode/anode powder mix from nickel metal hydride batteries disclosed in application Ser. No. 12/806,877.) The pH was adjusted down to 2.7 with acetic acid. Acetic acid was added slowly for another 2 hours while stirring to maintain the pH at 2.8 with a total of 43 g acetic acid added. The slurry was stirred for two hours and the pH rose to 3.5. The slurry was filtered and washed and dried under nitrogen in a furnace at 300° C. under vacuum at 100° C. The resulting up graded $AB_5$ powder (weighed 13.9 g) was screened through −325 mesh to recover 13.5 g which contained 18.5% La indicating essentially complete selective removal of the $Ni(OH)_2$. The intact recovered $AB_5$ containing the rare earth metals in the original ratio can be used directly in preparation of new $AB_5$ alloy. It can also be upgraded further with a limited reduction with molten sodium metal under inert atmosphere or with mild hydrogen reduction at 100-200° C.

EXAMPLE 3

24 g of a 42% by weight powder mixture (−140 mesh) of $Ni(OH)_2$ and 58% by weight of a hydrogen absorbing nickel alloy ($AB_5$) containing 18.5% La was stirred in 230 ml water at room temperature. (The mixture was the sink portion obtained by froth flotation of the cathode/anode powder mix from nickel metal hydride batteries.) The pH was adjusted down to 2.8 with 35 g of 85% lactic acid. After two hours the pH had risen to 4.0 and the pH was adjusted down to 3.1 with 10.3 g more of 85% lactic acid. The stirring was continued for another 2 hours and the pH only rose to 3.4. The slurry was filtered and washed and dried under nitrogen in a furnace at 300° C. under vacuum at 100° C. The resulting up graded $AB_5$ powder (weighed 14.6 g) was screened through −325 mesh and to recover 14.1 g and which contained 17.9% La indicating essentially complete selective removal of the $Ni(OH)_2$. The intact recovered $AB_5$ containing the rare earth metals in the original ratio can be used directly in preparation of new $AB_5$ alloy. It can also be upgraded further with a limited reduction with molten sodium metal under inert atmosphere or with mild hydrogen reduction at 100-300° C.

EXAMPLE 4

24 g of a 42% by weight powder mixture (−140 mesh) of $Ni(OH)_2$ and 58% by weight of a hydrogen absorbing nickel alloy ($AB_5$) containing 19.9% La was stirred in 230 ml water at room temperature. (The mixture was the sink portion obtained by froth flotation of the cathode/anode powder mix from nickel metal hydride batteries.) The pH was adjusted down to 2.8 with glycolic acid. After three hours the pH had risen to 3.9 and the pH was adjusted down to 2.9 with more glycolic acid. A total of 22.5 g of glycolic acid were used. The stirring was continued for another hour and the pH only rose to 3.0. The slurry was filtered and washed and dried under nitrogen in a furnace at 300° C. under vacuum at 100° C. The resulting up graded $AB_5$ powder (weighed 13.0 g) was screened through −325 mesh and to recover 12.7 g and which contained 19.9% La indicating essentially complete selective removal of the $Ni(OH)_2$. The intact recovered $AB_5$ containing the rare earth metals in the original ratio can be used directly in preparation of new $AB_5$ alloy. It can also be upgraded further with a limited reduction with molten sodium metal under inert atmosphere or with mild hydrogen reduction at 100-300° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the purification of hydrogen storage intermetallic alloy $AB_5$ together with any lanthanum present in a mixture obtained from spent nickel metal hydride batteries and the selective removal of $Ni(OH)_2$ present which comprises the steps of;
   A) Selectively dissolving the $Ni(OH)_2$ from the mixture containing $AB_5$ with a carboxylic acid having 1-8 carbon atoms and maintaining a pH of about 2.7 to 3.4 without dissolving the $AB_5$ and lanthanum;
   B) filtering the product of step A) to remove the solution containing any dissolved $Ni(OH)_2$;
   C) washing the solids from step B), and then
   D) drying the solids under an inert atmosphere.

2. The method of claim 1 wherein said carboxylic acid is selected from the group consisting of acetic propionic, lactic, formic, citric, glycolic and glyoxylic.

3. The method of claim 1 wherein the product of step D) is treated with hydrogen at an elevated temperature and pressure to remove any metal oxide.

4. The method of claim 1 including treating the product of step D) with 10-30% sodium metal in an inert atmosphere.

5. The method of claim 1 wherein the mixture of step A) is obtained from a froth flotation step of an $AB_5$ recovery process.

6. The method of claim 1 including the step of screening the product of step D) through −325 mesh.

7. A method for the purification of hydrogen storage intermetallic alloy $AB_5$ and lanthanum containing mixture having $Ni(OH)_2$ impurity which comprises the step of;
   a) forming a slurry of the mixture with a carboxylic acid having 1 to 8 carbon atoms and maintaining a pH of about 2.7 to 3.4 without dissolving $AB_5$ and lanthanum;
   b) filtering the product of step a);
   c) washing the solids from step b);
   d) drying the solids from step d) with hydrogen at a temperature of 300° C.

8. The method of claim 7 wherein the carboxylic acid is selected from the group consisting of acetic, lactic and glycolic.

* * * * *

UNITED STATES PATENT AND TRADEMARK OFFICE
CERTIFICATE OF CORRECTION

| | | |
|---|---|---|
| PATENT NO. | : 8,252,085 B1 | Page 1 of 1 |
| APPLICATION NO. | : 13/066103 | |
| DATED | : August 28, 2012 | |
| INVENTOR(S) | : W. Novis Smith et al. | |

It is certified that error appears in the above-identified patent and that said Letters Patent is hereby corrected as shown below:

In The Specification

At column 1 Lines 8-9 after the paragraph "Related Application", add the following new heading and paragraph:

--STATEMENT REGARDING FEDERAL FUNDING

This invention was made with government support under Contract No. DE-EE0002610 awarded by the Department of Energy. The government has certain rights in the invention.--

Signed and Sealed this
Nineteenth Day of April, 2016

Michelle K. Lee
*Director of the United States Patent and Trademark Office*